(12) United States Patent
Shokhor (10) Patent No.: US 9,207,953 B1
(45) Date of Patent: Dec. 8, 2015

(54) METHOD AND APPARATUS FOR MANAGING A PROXY AUTOCONFIGURATION IN SSL VPN

(75) Inventor: Sergey Shokhor, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 1996 days.

(21) Appl. No.: 10/833,677

(22) Filed: Apr. 28, 2004

(51) Int. Cl.
*G06F 15/177* (2006.01)
*G06F 9/445* (2006.01)
*H04L 29/08* (2006.01)

(52) U.S. Cl.
CPC .......... *G06F 9/44505* (2013.01); *H04L 67/288* (2013.01)

(58) Field of Classification Search
CPC ... H04L 63/0272; H04L 67/02; H04L 67/288; H04L 61/25; H04L 67/28; H04L 67/2814; G06F 9/44505
USPC .................................................. 709/249, 220
See application file for complete search history.

(56) References Cited

U.S. PATENT DOCUMENTS

| | | | | |
|---|---|---|---|---|
| 5,802,320 | A * | 9/1998 | Baehr et al. | 709/249 |
| 5,884,025 | A * | 3/1999 | Baehr et al. | 726/13 |
| 6,330,602 | B1 * | 12/2001 | Law et al. | 709/224 |
| 6,529,513 | B1 * | 3/2003 | Howard et al. | 370/401 |
| 6,829,638 | B1 * | 12/2004 | McBrearty et al. | 709/219 |
| 7,570,971 | B2 * | 8/2009 | Benning et al. | 455/552.1 |
| 7,698,388 | B2 * | 4/2010 | Hoover et al. | 709/219 |
| 8,166,141 | B1 * | 4/2012 | Van Horne, III | 709/223 |
| 2002/0069241 | A1 * | 6/2002 | Narlikar et al. | 709/203 |
| 2002/0103931 | A1 * | 8/2002 | Mott | 709/245 |
| 2003/0055990 | A1 * | 3/2003 | Cheline et al. | 709/229 |
| 2003/0217173 | A1 * | 11/2003 | Butt et al. | 709/237 |
| 2004/0006615 | A1 * | 1/2004 | Jackson | 709/223 |
| 2005/0138604 | A1 * | 6/2005 | Harrison | 717/121 |
| 2006/0031407 | A1 * | 2/2006 | Dispensa et al. | 709/219 |
| 2006/0143703 | A1 * | 6/2006 | Hopen et al. | 726/15 |

OTHER PUBLICATIONS

Harrenstein et al; "Hostname Server"; Oct. 1985; RFC 811; Network Working Group; pp. 1-5.*
Cisco01; "Cisco VPN Client User Guide for Mac OS X"; Oct. 2002; Release 3.7; pp. 1-88.*
Cisco02; "VPN 3000 Series Concentrator Reference, vol. 1: Configuration"; Jan. 2004; Release 4.1; Excerpt incl. chap 13; pp. 169.*
Microsoft, "Using Automatic Configuration and Automatic Proxy", Microsoft Internet Explorer 5 Resource Kit, Part 5—Maintaining and Supporting, http://www.microsoft.com/resources/documentation/ie/5/all/reskit/en-us/part5/ch21auto.mspx, pp. 1-6.
Netscape, "Navigator Proxy Auto-Config File Format", Mar. 1996, http://wp.netscape.com/eng/mozilla/2.0/relnotes/demo/proxy-live.html, pp. 1-14.

* cited by examiner

*Primary Examiner* — Oleg Survillo
(74) *Attorney, Agent, or Firm* — John W. Branch; Lowe Graham Jones PLLC (57) ABSTRACT

A method and apparatus for managing proxy autoconfiguration for a multihomed client. A client browser may employ a combined autoconfiguration module to split traffic based on a destination address of the traffic. The traffic may be split among at least two proxy servers. A proxy configuration manager may be employed to receive configuration information associated with each of the proxy servers. The proxy configuration manager enables the combined autoconfiguration module to be created based, in part, on the received configuration information. The proxy configuration manager further enables the client browser to split the traffic, based at least in part on the destination address.

20 Claims, 7 Drawing Sheets

METHOD AND APPARATUS FOR MANAGING A PROXY AUTOCONFIGURATION IN SSL VPN

FIELD OF THE INVENTION

The invention is related to networks, and in particular, to a method and apparatus for managing proxy autoconfiguration.

BACKGROUND OF THE INVENTION

A proxy server can be used as an access point to the Internet. As another application, a proxy server can also be used as an access point for a virtual private network (VPN).

A proxy server can typically be used as an access point to the Internet as follows. A client browser can be configured such that all of the client's HTTP requests are directed to the proxy server for the Internet before the HTTP request is forwarded to the Internet. The proxy configuration for the client browser may be manually configured by a user, or may be autoconfigured by employing, for example, a script. Upon receiving the HTTP request, the proxy server for the Internet determines whether it has a copy of the requested object stored locally. If so, the proxy server for the Internet responds to the HTTP request. If not, the proxy server for the Internet employs a TCP connection over the Internet to a destination server. The proxy server then employs the TCP connection to send the HTTP request to the destination server associated with the HTTP request. If the request is successful, the destination server sends the requested object to the proxy server for the Internet, and the proxy server for the Internet sends the requested object to the client browser.

In addition to the caching functionality previously described, a proxy server may be configured to provide various security and administrative control services. For example, a proxy server may be configured to filter requests that are received by the proxy server. Also, a proxy server may be employed to mask the identity of the client browser that originated the request to the destination server.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The phrase "in one embodiment," as used herein does not necessarily refer to the same embodiment, although it may. The phrase "in another embodiment," as used herein does not necessarily refer to a different embodiment, although it may. The terms "based on", "based in part on", and "based at least in part on", are not necessarily exclusive, and may be based on additional factors, but need not be. The meaning of "a", "an", and "the" includes plural reference, and the meaning of "in" includes "in" and "on."

Briefly stated, the invention is related to a method and apparatus for managing proxy autoconfiguration for a multi-homed client. A client browser may employ a combined autoconfiguration module to split traffic based on a destination address of the traffic. The traffic may be split among at least two proxy servers.

A proxy configuration manager may be employed to receive configuration information associated with each of the proxy servers. The proxy configuration manager enables the combined autoconfiguration module to be created based, in part, on the received configuration information. The proxy configuration manager further enables the client browser to split the traffic, based at least in part on the destination address.

Figure 1:
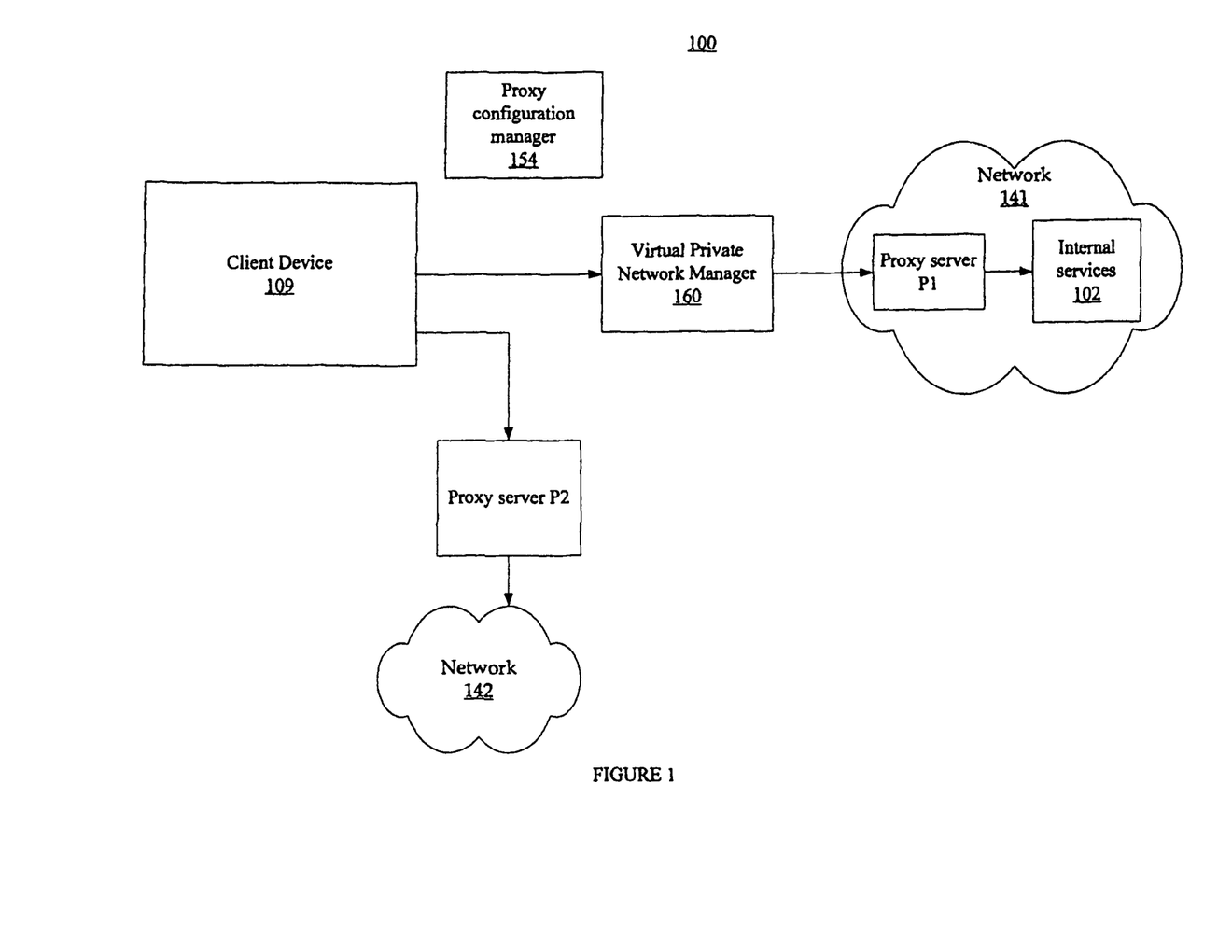
FIG. 1 illustrates a block diagram of an embodiment of a system for proxy configuration management.

FIG. 1 illustrates a block diagram of an embodiment of system 100. System 100 includes client device 109, virtual private network (VPN) manager 160, proxy server P2, proxy configuration manager 154, network 142, and network 141. Network 141 may include proxy server P1 and internal services 102. In one embodiment, network 142 is the Internet, and proxy server P2 is a local proxy server for accessing the Internet. In other embodiments, network 142 may be an extranet other than the Internet. System 100 may also include additional proxy servers and networks (not shown) that are arranged for communication with client device 109.

In one embodiment, proxy configuration manager 154 is included in client device 109. In another embodiment, proxy configuration manager 154 is included in VPN manager 160. In yet another embodiment, proxy configuration manager 154 may be included in another network device not shown in FIG. 1. In one embodiment, proxy configuration manager 154 includes a computer program embodied on a computer-readable medium. In one embodiment, proxy configuration manager 154 is configured to provide a modulated data signal to enable actions to be performed for managing proxy configuration. In any event, proxy configuration manager 154 is described in more detail below.

Network 142 is enabled to employ any form of computer readable media for communicating information from one electronic device to another. Also, network 142 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 142 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices with various degrees of mobility. For example, network 142 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link.

Additionally, network 142 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Network 141 is substantially similar to network 142. However, network 141 is intended to represent an intranet, such as for a business, organization, or the like.

An embodiment of VPN manager 160 is described in more detail below, in conjunction with FIG. 4. Briefly, however, virtual private network manager 160 is a network device that is configured to provide access to network 141. Traffic sent between network 141 and client device 109 may be encrypted. VPN manager 160 may be implemented on a variety of network devices including personal computers, desktop computers, multiprocessor systems, microprocessor-based devices, network PCs, servers, gateways, network appliances, and the like.

VPN manager 160 may also include a firewall. The firewall may include one or more computing devices configured to shield a resource, such as a resource server, within a locally managed security perimeter from an undesired external access. The firewall may be implemented as a filter, gateway, network address translator (NAT), and the like configured to minimize the undesired external accesses.

Generally, client device 109 may include virtually any computing device capable of connecting to another computing device to send and receive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client devices 109 may be any device that is capable of connecting using a wired or wireless communication medium such as a PDA, POCKET PC, wearable computer, and any other device that is equipped to communicate over a wired and/or wireless communication medium. One embodiment of client device 109 is described in greater detail with regard to FIG. 3 below.

Proxy server P1 is configured to receive requests for services within network 141. Similarly, proxy server P2 is configured to receive requests for services within network 142. Proxy servers P1 and P2 may be implemented on a variety of network devices including personal computers, desktop computers, multiprocessor systems, microprocessor-based devices, network PCs, servers, gateways, network appliances, and the like.

Internal services 102 may represent virtually any resource, service, device, and the like, to which client devices 109 may seek access from within network 141. Such resources may include, but are not limited to, web services, mail services, database services, repositories, legacy services, telnet services, FTP services, and the like. As such internal services 102 may be implemented on a variety of computing devices including personal computers, desktop computers, multiprocessor systems, microprocessor-based devices, network PCs, servers, and the like.

Client device 109 may be configured to employ proxy server P2 to access services in network 142. Also, client device 109 may make a request to VPN manager 160 to initiate a VPN connection to network 141. Proxy configuration manager 154 may be configured to manage proxy configuration information for client device 109 if client device 109 initiates a VPN connection. Although not shown, client device 109 may also initiate connections with private and/or public network(s) other than networks 141 and 142.

When proxy server P1 is employed to access internal services 102, proxy configuration manager 154 receives proxy configuration information for proxy server P1. Also, if client device 109 is configured to employ one or more additional proxy servers (e.g. proxy server P2) to access services from one or more additional networks (e.g. network 142), proxy configuration manager 154 may also receive configuration information for the additional proxy servers.

When proxy server P1 is employed to access internal services 102, and client device 109 does not employ additional proxy services, then proxy configuration manager 154 may enable the creation of a proxy autoconfiguration module that includes configuration information for proxy server P1. If proxy server P1 is employed to access internal services 102, and client device 109 is configured to employ additional proxy servers (e.g. proxy server P2) to access the services of one or more additional networks (e.g. network 142), then proxy configuration manager 154 may enable the creation of a combined autoconfiguration module. The combined autoconfiguration module may include configuration information associated with proxy server P1 and configuration information associated with the other proxy server(s). The combined autoconfiguration module is arranged to enable traffic to be split between proxy server P1 and one or more additional proxy servers (e.g. proxy server P2), based, in part, on the destination network address.

In one embodiment, the combined autoconfiguration module is stored in client device 109. In another embodiment, the combined autoconfiguration module is stored in a network device other than client device 109 and is accessed remotely by client device 109. In one embodiment, the browser of client device 109 may be arranged to employ the combined autoconfiguration module by providing the combined autoconfiguration module with information about the destination address of the traffic. The combined autoconfiguration module is arranged to determine which proxy server, if any, should be used to access the destination address, and provide the client browser with information associated with the determined proxy server.

In one embodiment, the combined autoconfiguration module is an autoconfiguration script. In one embodiment, the combined autoconfiguration module is a text file that includes code, such as JavaScript code. The "combined autoconfiguration module" may also be a file, program, code, and the like. It may be in a human readable form or in a binary form. In one embodiment, the combined autoconfiguration module is in the form of a markup language, such as XML.

In one embodiment, the VPN is established as an SSL VPN connection. Proxy configuration manager 154 may support both local and remote proxy configurations. For a local proxy configuration, client device 109 may connect to VPN manager 160 through proxy server P1 with authentication. For a remote proxy configuration, a VPN administrator may configure proxy settings for the VPN connection.

Figure 2:
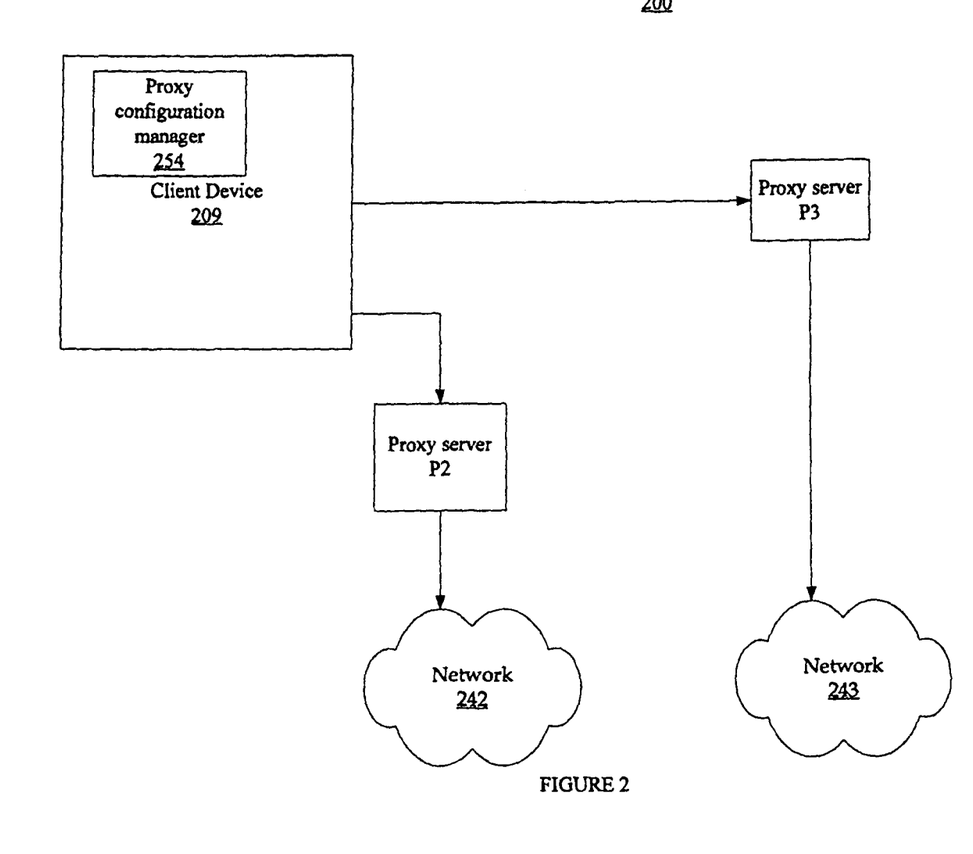
FIG. 2 shows a block diagram of another embodiment of a system for proxy configuration management.

FIG. 2 illustrates a block diagram of an embodiment of system 200. System 200 includes proxy server P2, proxy server P3, network 242, network 243, and client device 209. Client device 209 includes proxy configuration manager 254. Components in system 200 may operate in a similar manner as similarly named components in FIG. 1, and may operate in a different manner in some ways.

Although network 242 and 243 are shown as two different networks, in one embodiment, network 242 and network 243 are each the same network, e.g., the Internet. In another embodiment, network 242 and network 243 are two different networks.

In one embodiment, proxy server P2 is associated with a first interne service provider (ISP), and proxy server P3 is associated with a second ISP. The first and second ISPs are administratively distinct. Client device 209 may employ the first ISP and proxy server P2 to access network 242, and may also employ the second ISP and proxy server P3 to access network 243.

Figure 3:
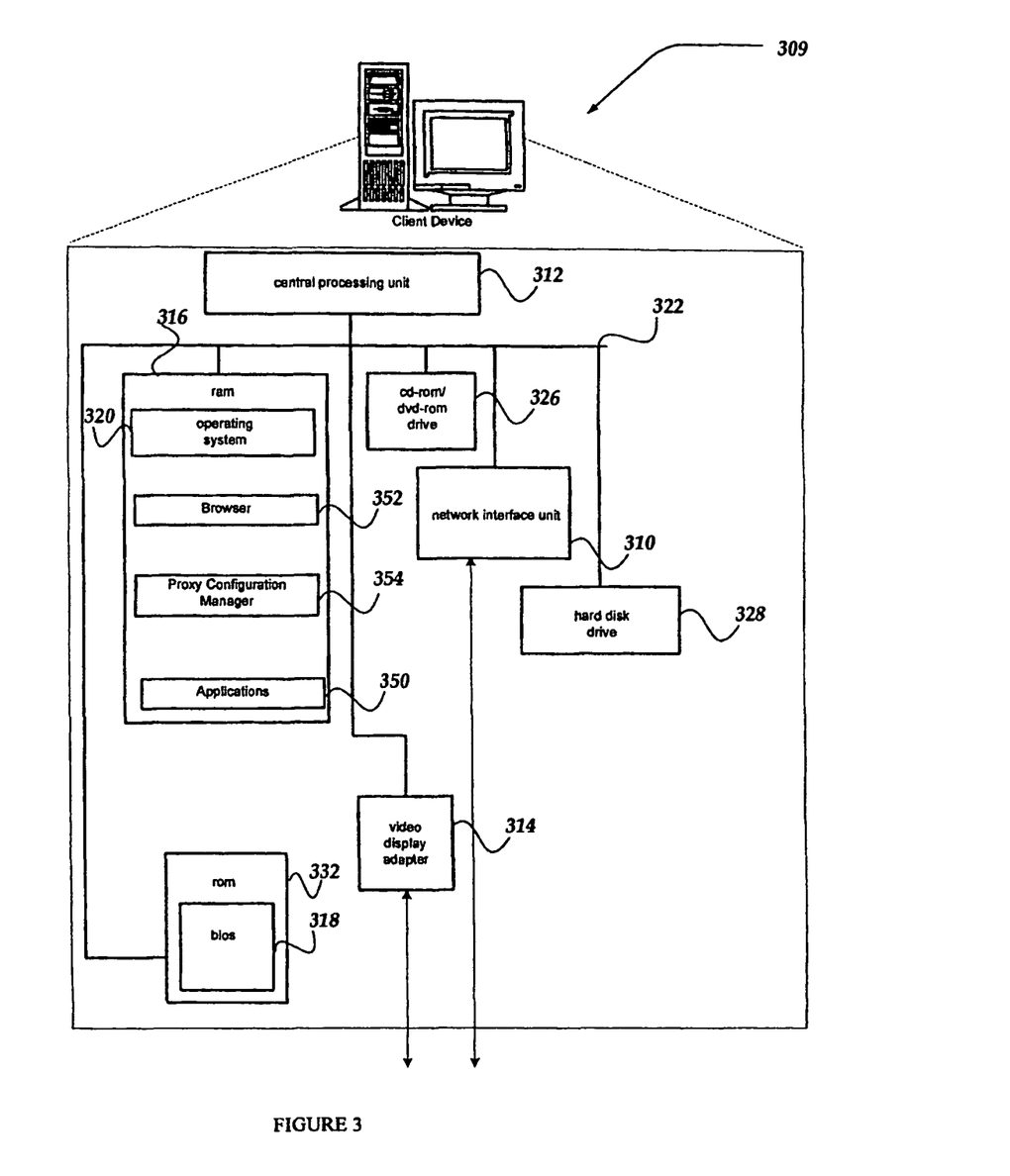
FIG. 3 shows a block diagram of an embodiment of a client device of FIG. 1 or FIG. 2 that includes a proxy configuration manager.

FIG. 3 shows a block diagram of an embodiment of client device 309 that includes the proxy configuration manager. FIG. 3 may represent, for example, an embodiment of client device 109 of FIG. 1 or client device 209 of FIG. 2. Client device 309 may include many more components than those shown. The components shown, however, are sufficient to disclose an illustrative embodiment for practicing the invention.

Client device 309 may include processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive 326, and/or floppy disk drive. The mass memory stores operating system 320 for controlling the operation of client device 309. Any general-purpose operating system may be employed. Basic input/output system ("BIOS") 318 is also provided for controlling the low-level operation of client device 309. Client device 309 can also communicate with a communications network, such as networks 141 and 142 in FIG. 1, or networks 242 and 243 of FIG. 2, via network interface unit 310, which is constructed for use with various communication protocols including the TCP/IP protocol. In one embodiment, client device 309 is also capable of connecting to a VPN such as network 141 of FIG. 1 using various protocols such as the secure socket layer (SSL) protocol. A network interface unit is sometimes known as a transceiver, transceiving device, or network interface card (NIC). In one embodiment, client device 309 includes one NIC for accessing network 242 of FIG. 2, and includes a second NIC for accessing network 243 of FIG. 2.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information, which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, security programs, VPN programs, tunneling applications, and so forth. Other applications in the mass memory may include proxy configuration manager 354 and browser 352.

Browser 352 may include virtually any browser, such as Microsoft Internet Explorer, Netscape Navigator, and the like.

In one embodiment, browser 352 is configured to provide client 109 access to services in network 142 of FIG. 1. In one embodiment, browser 352 employs proxy server P2 to access services within network 142. To access network 142 through proxy server P2, browser 352 may be configured with default proxy server information that is associated with proxy server P2.

Browser 352 may be further configured to send proxy configuration information associated with the default browser configuration to proxy configuration manager 354 in response to a request for proxy configuration manager 354.

Browser 352 may initiate a VPN connection to network 141 by accessing VPN manager 160 of FIG. 1. Also, browser 352 may be configured, by proxy configuration manager 354, to employ a combined autoconfiguration module to manage proxy configurations.

In another embodiment, browser 352 is configured to provide client 109 access to services in networks 242 and 243 of FIG. 2.

Proxy configuration manager 354 includes components that are configured to perform actions. In one embodiment, proxy configuration manager 354 includes a computer program running in RAM 316. In this embodiment, the components in configuration manager 354 may include code segments and the like. The code segments may be configured to perform actions when the code segments are fetched and decoded by processing unit 312. Components of proxy configuration manager 354 may also be implemented in hardware, firmware, and the like. Also, it is understood that two or more of the components of proxy configuration manager 354 may be implemented as a single component.

In one embodiment, proxy configuration manager 354 includes a component (not shown) that is configured to request information that is associated with proxy server P1. The information may include configuration information for proxy server P1. If the request for information is made, VPN manager 160 may respond to the request for the information, which is in turn received by network interface unit 310.

Proxy configuration manager 354 may also include a component (not shown) that is configured to request additional information that is associated with another proxy server. The additional information may include additional configuration information that is associated with proxy server P2. In one embodiment, if the request for the additional information is made, browser 352 may provide the additional information to the proxy configuration manager in response to the request. In another embodiment, if the request for the additional information is made, an internet service provider associated with proxy server P2 provides the additional information.

Proxy configuration manager 354 may also include a component (not shown) that is configured to request information that is associated with proxy server P3 of FIG. 2. If the request for information associated with proxy server P3 is made, the internet service provider associated with proxy server P3 may provide the information in response to the request.

Proxy configuration manager 354 also includes a component (not shown) that is configured to enable a combined autoconfiguration module to be created. In one embodiment, such as system 100 of FIG. 1, the combined autoconfiguration module may contain the configuration information for proxy server P1 and the additional configuration information for proxy server P2. The combined autoconfiguration module may also contain configuration information for one or more additional proxy servers. In another embodiment, such as system 200 of FIG. 2, the combined autoconfiguration module includes information from proxy server P2 and proxy server P3. In any case, the combined autoconfiguration module may enable browser 352 to split traffic between two or more of the proxy servers. For example, in system 100, the combined autoconfiguration module may be employed by browser 352 to split traffic between proxy server P1 and proxy server P2 as shown in FIG. 1.

As previously described, in other embodiments, proxy configuration manager 354 may reside within a different network device, such as VPN manager 160.

Figure 4:
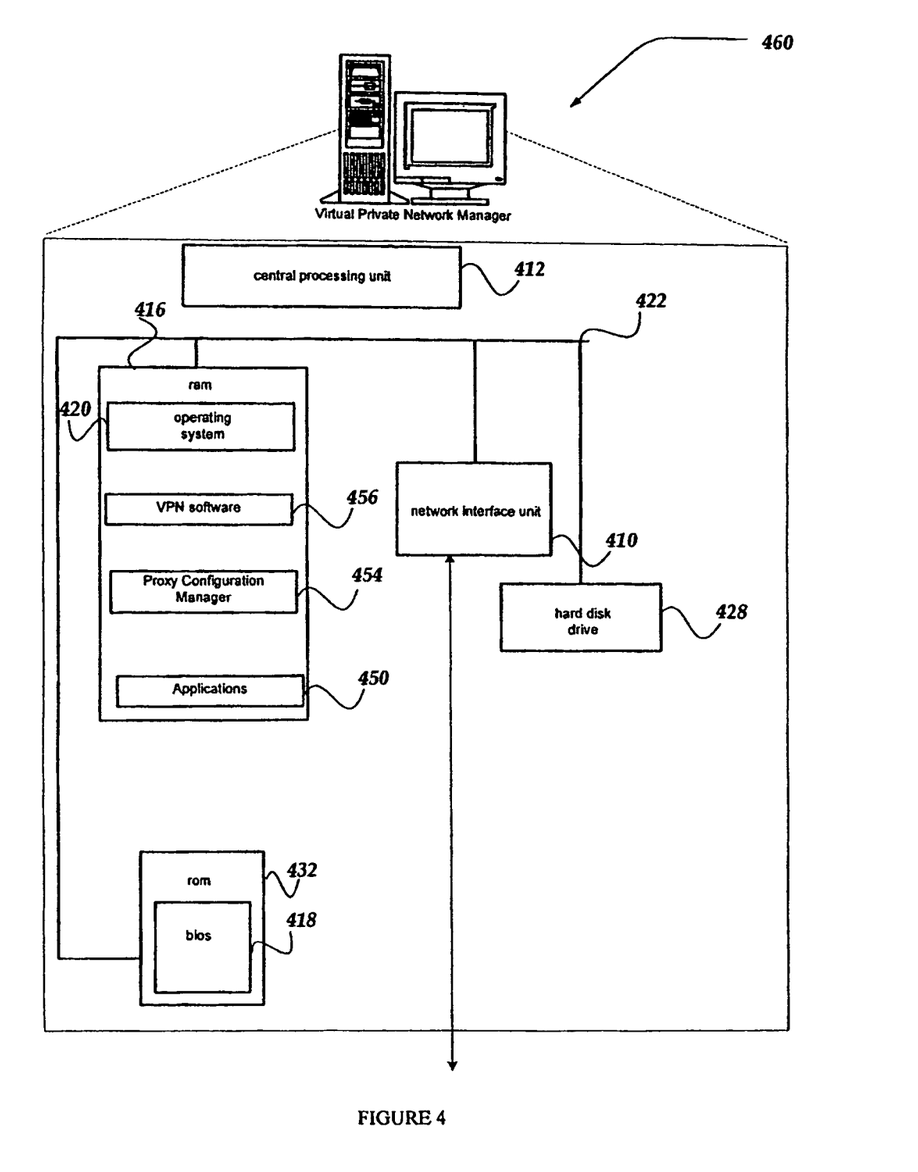
FIG. 4 illustrates a block diagram of an embodiment of the VPN manager of FIG. 1 that includes the proxy configuration manager.

FIG. 4 illustrates a block diagram of an embodiment of VPN manager 460 that includes the proxy configuration manager. VPN manager 460 may include many more components than those shown. The components shown, however, are sufficient to disclose an illustrative embodiment for practicing the invention.

VPN manager 460 may include virtually any network device that is configured to provide access to a VPN, such as network 141. VPN manager 460 may include processing unit 412 and a mass memory, in communication with each other via bus 422. The mass memory generally includes RAM 416, ROM 432, and one or more permanent mass storage devices, such as hard disk drive 428, tape drive, optical drive, and/or floppy disk drive. The mass memory stores operating system 420 for controlling the operation of VPN manager 460. Any general-purpose operating system may be employed. Basic input/output system ("BIOS") 418 is also provided for controlling the low-level operation of VPN manager 460. VPN manager 460 is capable of communicating with client device 109 and network 141 via network interface unit 410 to provide a VPN connection to client device 109. As shown in FIG. 4, the mass memory of VPN manager 460 may include proxy configuration manager 454 and/or VPN software 456 and/or other applications 450. VPN software 456 may include code segments and the like that are configured to perform actions for controlling various VPN management functions.

Proxy configuration manager 454 may operate in a substantially similar manner to proxy configuration manager 354, as described above in conjunction with FIG. 3. However, proxy configuration manager 454 may operate differently than proxy configuration manager 354 in some ways. If proxy configuration manager 454 makes a request for the information that is associated with proxy server P2, a browser in client device 109 may respond to the request, which is in turn received by network interface unit 410. If proxy configuration manager 454 makes a request for the additional information that is associated with proxy server P1, VPN software 456 may respond to the request.

Figure 5:
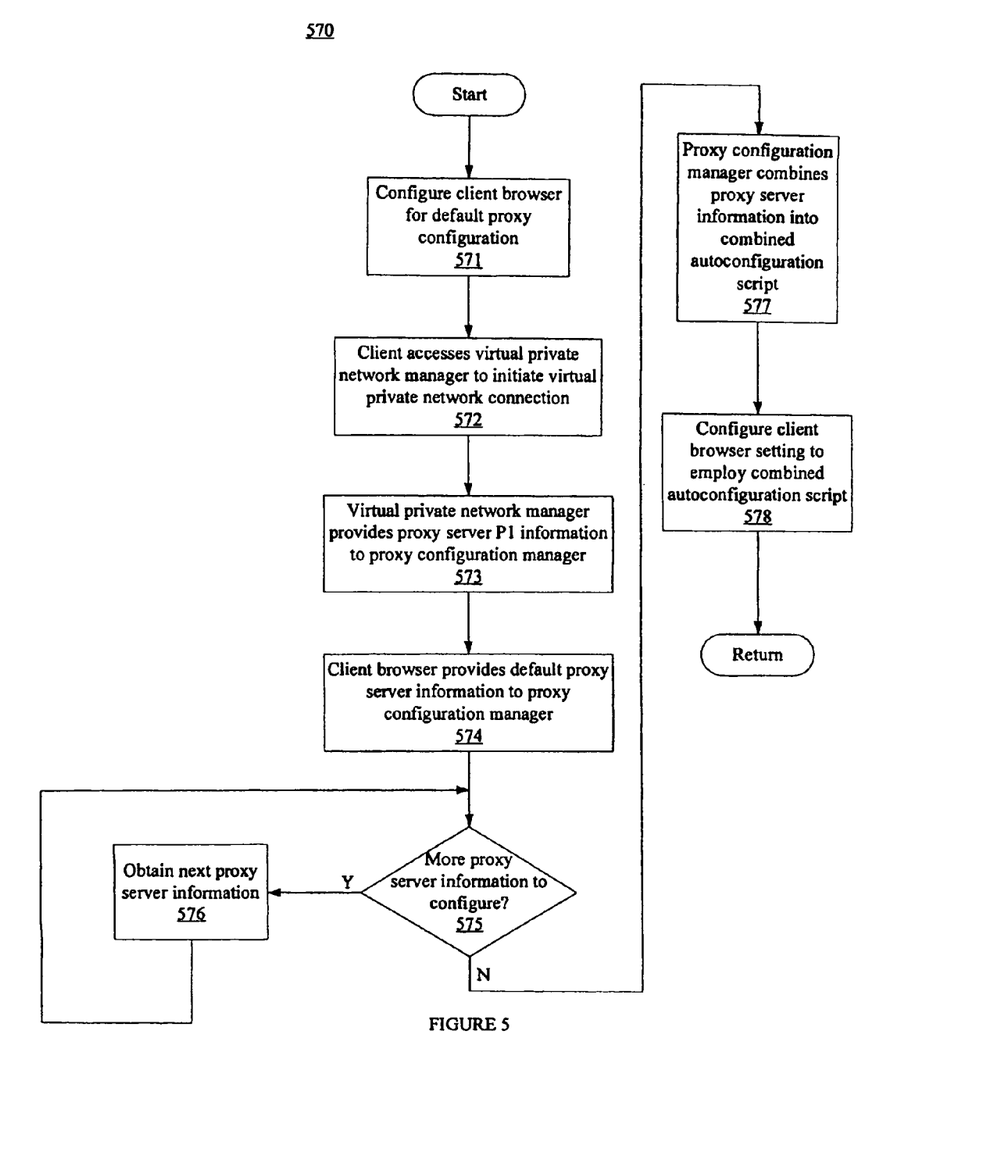
FIG. 5 shows a flow chart of an embodiment of a process for configuring a client browser for proxy autoconfiguration to split traffic among proxy servers.

FIG. 5 shows a flow chart of an embodiment of process 570. Process 570 may be employed in an environment such as system 100 illustrated in FIG. 1, or system 200 illustrated in FIG. 2, and described above. For simplicity of discusion, the reference numbers in the following discussion refer to FIG. 1. Process 570 may be employed for configuring a client browser for proxy autoconfiguration to split traffic among two or more proxy servers, including proxy server P1. Proxy server P1 is associated with a VPN.

After a start block, the process proceeds to block 571, where a browser of a client device is configured for default proxy server information. The process then moves from block 571 to block 572, where the client device accesses a VPN manager to initiate a VPN connection. Next, the process advances to block 573, where the VPN manager provides information that is associated with proxy server P1 to a proxy configuration manager. The process then proceeds to block 574, where the client browser provides the default proxy server information to the proxy configuration manager.

Next, the process moves to decision block 575, where a determination is made as to whether there is more proxy server information to configure. If not, the process advances to block 577, where the proxy server information is combined into a combined autoconfiguration module. The combined autoconfiguration module includes configuration information associated with proxy server P1 and configuration information associated with the other proxy server. In one embodiment, the proxy configuration manager creates the combined proxy autoconfiguration module. In one embodiment, the proxy configuration manager causes the proxy autoconfiguration module to be created on the client device. In another embodiment, the proxy configuration manager causes the combined proxy autoconfiguration module to be created on the VPN manager.

Next, the process proceeds to block 578, where the client browser is configured to employ the combined autoconfiguration module. In one embodiment, the combined autoconfiguration module is stored in the client device, such as client device 109 of FIG. 1. In other embodiments, the combined autoconfiguration module may be stored on another network device, such as VPN manager 160 of FIG. 1. In this embodiment, the client browser may be configured to point to the combined autoconfiguration module on the other network device.

The process then moves to a return block, where other processing is resumed.

At decision block 575, if it is determined that there is more proxy server information to configure, the process proceeds to block 576, where information associated with the next proxy server is obtained. The process then moves to decision block 575, until there are no new proxy servers to be added.

Figure 6:
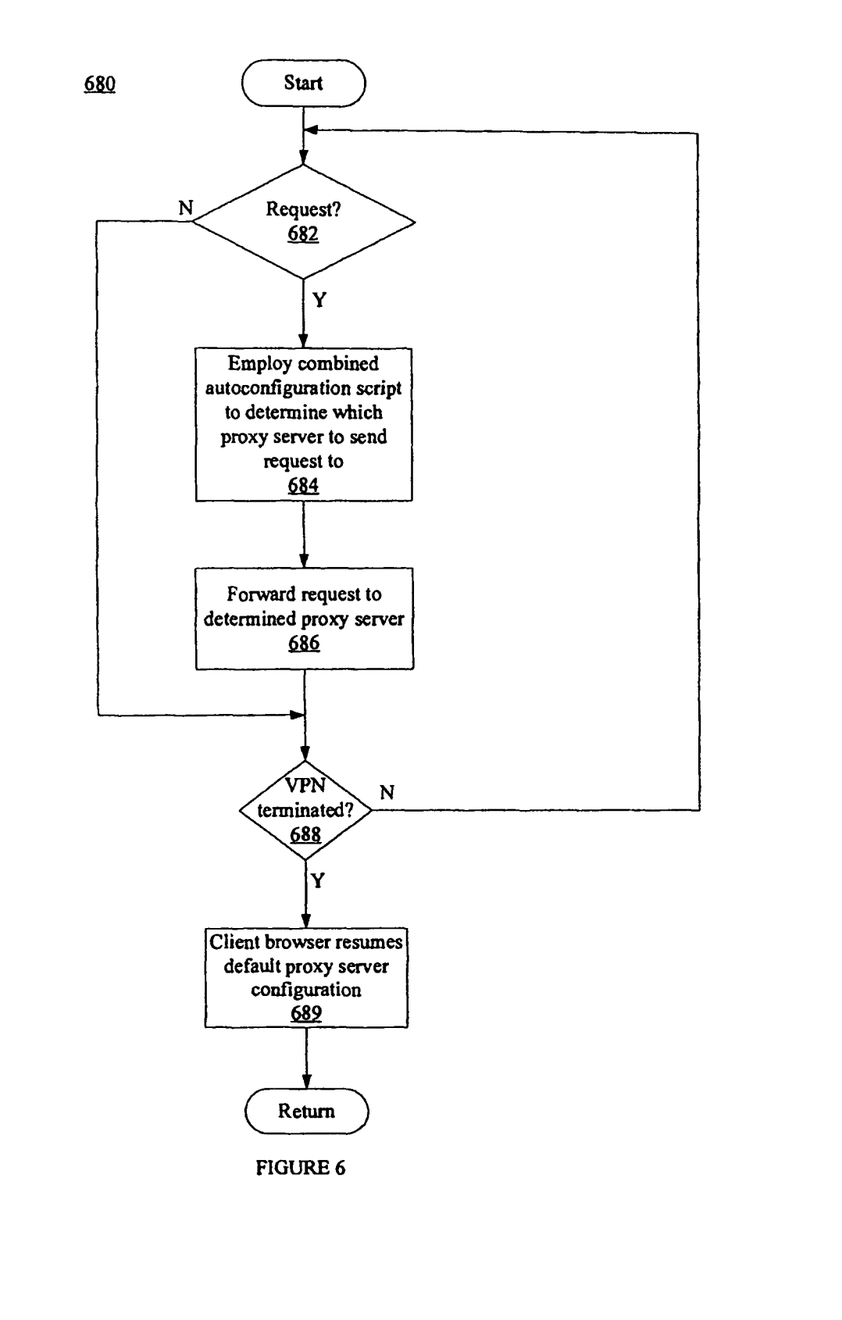
FIG. 6 illustrates a flow chart of an embodiment of a process for employing a combined autoconfiguration module to split traffic among proxy servers.

FIG. 6 illustrates a flow chart of an embodiment of process 680. Process 680 may be employed in an environment such as system 100 illustrated in FIG. 1, or system 200 illustrated in FIG. 2, and described above. Process 680 may be used for employing a combined autoconfiguration module to split traffic among two or more proxy servers, such as proxy servers P1 and P2 of FIG. 1.

After a start block the process proceeds to decision block 682, where the client browser determines whether the client device has made a request, where the request is to be sent to an associated network address. If so, the process moves to block 684, where a combined autoconfiguration module is employed to determine which proxy server to send the request to.

The process then advances to block 686, where the request is forwarded to the determined proxy server, which enables the determined proxy server to forward the request to the network address. Accordingly, the proxy configuration manager enables the client to connect to the VPN in a split tunnel mode, where, based, in part, on the destination address of the traffic from the client, the traffic is split between the VPN connection and another network. Moreover, the traffic may be successfully split based on the destination address even where a proxy server is required to access the VPN connection and another proxy server is required to access the Internet.

The process then proceeds to decision block 688, where a determination is made as to whether the VPN has been terminated. If so, the process moves to block 689, where the client browser resumes a default proxy server configuration (e.g., the default proxy server configuration from block 571). The proxy configuration manager may configure the client browser to point to the default proxy server configuration instead of the combined proxy autoconfiguration module. Next, the process advances to a return block, where other functionality is resumed.

At decision block 688, if it is determined that the VPN has not been terminated, the process moves to decision block 682. At decision block 682, if it is determined that the client has not made a network request, the process proceeds to decision block 688.

At block 684, in one embodiment, the client browser employs the combined autoconfiguration module by calling a function, and includes the URL (uniform resource locator) to the remote address as a parameter of the function. In this embodiment, the combined autoconfiguration module may return information associated with the selected proxy server to the client browser in response to the function call. The information may include the URL of the proxy server, and the port number to use for sending requests to the proxy server.

In one embodiment, the combined autoconfiguration module determines which proxy server to send the request to by determining whether the requested network address is included in a DNS address space. The DNS address space may include a list of hostnames, or the like, that are included in the VPN network. In one embodiment, if the requested address is included in the list of hostnames, it is determined that proxy configuration P1 is the determined proxy server. In one embodiment, if the requested address is not included in the list of hostnames, it is determined that proxy configuration P2 is the determined proxy server.

The list of hostnames may be configured by a VPN administrator. Also, the list of hostnames may support wildcards, using a symbol such as '*' or '?'. For example, the list of hostnames may be specified by the VPN administrator as "*.company.xyz.com". In one embodiment, the list of hostnames is included in the combined autoconfiguration module. In another embodiment, another network device includes the list. In this embodiment, a request may be made to the other network device to determine whether the network address is included in the list of hostnames.

In other embodiments, criteria other than a list of hostnames may be used to determine which proxy server to send the traffic to based, at least in part, on the destination address.

Figure 7:
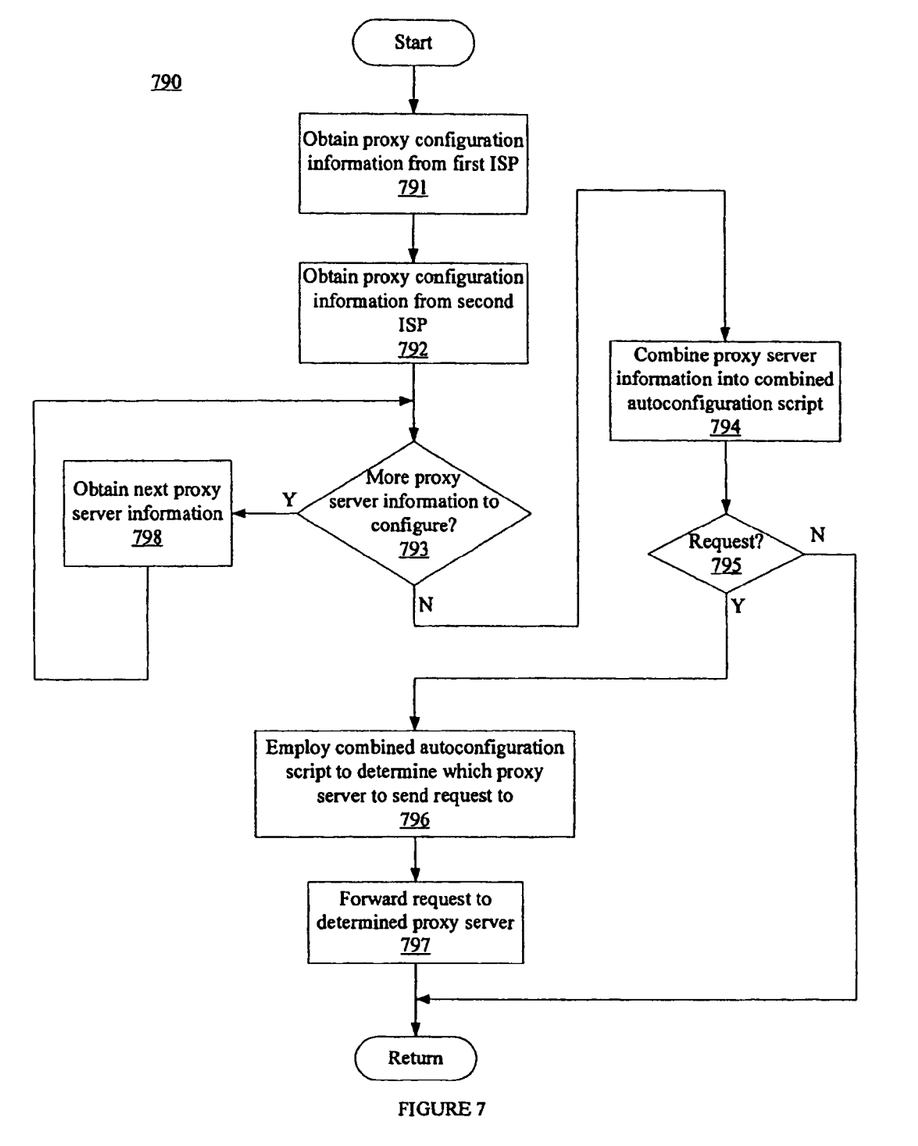
FIG. 7 shows a flow chart of an embodiment of a process for creating and employing a combined autoconfiguration module to split traffic among proxy servers, in accordance with aspects of the present invention.

FIG. 7 shows a flow chart of an embodiment of a process 790. Process 790 may be employed in an environment such as system 200 of FIG. 2. Process acts in process 790 may be substantially similar to similarly-named process acts in FIGS. 5-6, and may be different in some ways. Process 790 may be employed for creating and employing a combined autoconfiguration module to split traffic among proxy servers, such as proxy servers P2 and P3 of FIG. 2.

After a start block, the process proceeds to block 791, where proxy configuration information from a first ISP is obtained. The process then moves to block 792, where proxy configuration information from a second ISP is obtained.

For both block 791 and block 792, the proxy configuration information may be obtained by making a request for the information and receiving a response to the request from the associated ISP. For each ISP, the proxy information may include the address of the associated proxy server, the port number to be used to access the proxy server, and a DNS address space that is associated with the ISP.

After block 792, the process advances to decision block 793, where a determination is made as to whether there is more proxy server information to configure. If not, the process proceeds to decision block 794, where the proxy server information is combined into a combined autoconfiguration script. The process then moves to decision block 795, where a determination is made as to whether a network request has been made by the client. If so, the process moves to block 796, where the combined autoconfiguration script is employed to determined which proxy server to send the network request to. The process then advances to block 797, where the network request is forwarded to the determined proxy server. The process then proceeds to a return block, where other processing is resumed.

At decision block 793, if it is determined that there is more proxy server information to obtain, the process moves to block 798, where the next proxy server information is obtained. The process then proceeds from block 798 to decision block 793.

At decision block 795, if it is determined that a network request has not been made, the process advances to the return block, where other processing is resumed.

In one embodiment, at block 796, the combined autoconfiguration script employs the DNS address space associated with the first ISP and/or the DNS address space associated with the second ISP to select the determined proxy server. Also, the combined autoconfiguration script may provide the URL of the determined proxy server and the port number to use to forward a request to the determined proxy server.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for managing proxy configurations, comprising:

requesting information that is associated with a first proxy server, wherein the first proxy server is associated with a virtual private network (VPN), a first internet service provider (ISP), and a first Domain Name System (DNS) address space, wherein the VPN is associated with a VPN manager;

receiving the information;

requesting additional information that is associated with a second proxy server that is associated with a second ISP and a second DNS address space, wherein the first and the second ISPs are administratively distinct;

receiving the additional information;

independently creating, by a client device, a combined autoconfiguration script based on current client proxy settings, without the current client proxy settings being provided to the VPN manager, wherein the combined autoconfiguration script comprises at least part of the information and at least part of the additional information;

receiving at least one network request that is associated with a network address;

running the combined autoconfiguration script that performs autoconfiguration, including determining which proxy server to send the at least one network request to, based in part on the network address and one or more of the first ISP, the first DNS address space, the second ISP, or the second DNS address space; and forwarding the at least one network request to the determined proxy server, wherein the combined autoconfiguration script is configured to split traffic between at least the first and the second proxy servers based on traffic destination by performing the determining step for each of the at least one network request.

2. The method of claim 1, wherein the information includes a URL of the first internet service provider, and wherein the additional information includes a URL of the second proxy server.

3. The method of claim 1, wherein the information includes a list of addresses that are associated with the first internet service provider, and wherein the additional information includes another list of addresses that are associated with the second ISP.

4. A method for managing proxy configurations, comprising:

receiving information that is associated with a first proxy server, wherein the first proxy server is associated with a virtual private network (VPN), a first Internet Service Provider (ISP), and a first Domain Name System (DNS) address space, wherein the VPN is associated with a VPN manager;

receiving additional information that is associated with a second proxy server, wherein the second proxy server is associated with a second ISP and a second DNS address space, wherein the first and the second ISPs are administratively distinct;

independently creating, by a client device, a combined autoconfiguration script based on current client proxy settings, without the current client proxy settings being provided to the VPN manager, wherein the combined autoconfiguration script comprises at least part of the information and at least part of the additional information;

configuring a client browser of the client device to employ the combined autoconfiguration script in managing the proxy configurations;

receiving a request that is associated with a network address;

running the combined autoconfiguration script that performs autoconfiguration, including determining which proxy server to send the request to based on one or more of the first ISP, the first DNS address space, the second ISP, or the second DNS address space; and forwarding the request to the determined proxy server, wherein determining which proxy server to send the request comprises:

determining whether the requested network address is included in a list of hostnames included in the first DNS address space;

when the network address is included in the list, selecting the first proxy server to manage the requested network address; and when the network address is not included in the list, selecting the second proxy server to manage the requested network address.

5. The method of claim 4, further comprising:

receiving yet additional information that is associated with a third proxy server, wherein the combined autoconfiguration script further comprises at least part of the yet additional information.

6. The method of claim 4, wherein the second proxy server comprises a local proxy server configured for accessing the Internet.

7. The method of claim 4, wherein the list of hostnames is a list of hostnames included in the virtual private network.

8. The method of claim 4, further comprising:

configuring the client browser for a default proxy configuration; and accessing the virtual private network manager to initiate a virtual private network connection.

9. The method of claim 8, further comprising:

when the virtual private network connection is terminated, resuming the default proxy configuration for the client browser.

10. An article of manufacture including a non-transitory processor-readable storage medium having processor-executable code encoded therein, which when executed by one or more processors, performs actions, the actions comprising:

receiving information that is associated with a first proxy server, wherein the first proxy server is associated with a virtual private network (VPN), associated with a first Internet Service Provider (ISP), and associated with a first Domain Name System (DNS) address space, wherein the VPN is associated with a VPN manager;

receiving additional information that is associated with a second proxy server that is associated with a second ISP and associated with a second DNS address space, wherein the first and the second ISPs are administratively distinct;

independently creating at a client device a combined autoconfiguration script based on current client proxy settings, without the current client proxy settings being provided to the VPN manager, wherein the combined autoconfiguration script comprises at least part of the information and at least part of the additional information;

configuring a client browser of the client device to employ the combined autoconfiguration script in managing the proxy configurations;

receiving a request that is associated with a network address;

running the combined autoconfiguration script that performs autoconfiguration, including determining which proxy server to send the request to based on one or more of the first ISP, the first DNS address space, the second ISP, or the second DNS address space; and forwarding the request to the determined proxy server, wherein determining which proxy server to send the request comprises:

determining whether the requested network address is included in a list of hostnames included in the first DNS address space;

when the network address is included in the list, selecting the first proxy server to manage the requested network address; and when the network address is not included in the list, selecting the second proxy server to manage the requested network address.

11. The article of manufacture of claim 10, the actions further comprising:

configuring the client browser for a default proxy configuration, wherein the default proxy configuration is associated with the second proxy server; and accessing the virtual private network manager to initiate a virtual private network connection for the client device.

12. The article of manufacture of claim 11, the actions further comprising:

when the virtual private network connection is terminated, resuming the default proxy configuration for the client browser.

13. An article of manufacture including a non-transitory processor-readable storage medium having processor-executable code encoded therein, which when executed by one or more processors, performs actions for managing proxy configurations, comprising:

receiving information that is associated with a first proxy server, wherein the first proxy server is associated with a virtual private network (VPN), associated with a first Internet Service Provider (ISP), and associated with a first Domain Name System (DNS) address space, wherein the VPN is associated with a VPN manager;

receiving additional information that is associated with a second proxy server, wherein the second proxy server is associated with a second ISP and associated with a second DNS address space, wherein the first and the second ISPs are administratively distinct;

independently creating a combined autoconfiguration script at a client device based on current client proxy settings, without the current client proxy settings being provided to the VPN manager, wherein the combined autoconfiguration script comprises at least part of the information and at least part of the additional information;

receiving at least one network request that is associated with a network address;

running the combined autoconfiguration script that performs autoconfiguration, including determining which proxy server to send the at least one network request to, based in part on the network address and one or more of the first ISP, the first DNS address space, the second ISP, or the second DNS address space; and forwarding the at least one network request to the determined proxy server, wherein the combined autoconfiguration script is configured to split traffic among the first and the second proxy servers based on the traffic destination by performing the determining step for each of the at least one network request.

14. The article of manufacture of claim 13, the actions further comprising:

configuring a client browser of the client device to employ the combined autoconfiguration script.

15. The article of manufacture of claim 13, the actions further comprising:

receiving yet additional information that is associated with a third proxy server, wherein the combined autoconfiguration script further comprises at least part of the yet additional information.

16. A network device for managing proxy configurations, comprising:

a transceiver that is configured to send and receive signals over a network; and a proxy configuration manager that is configured to perform actions, the actions comprising:

requesting information that is associated with a first proxy server that is associated with a first Internet Service Provider (ISP) and associated with a first Domain Name System (DNS) address space, wherein the first proxy server is arranged to proxy traffic over a virtual private network (VPN), wherein the VPN is associated with a VPN manager;

requesting additional information that is associated with a second proxy server that is associated with a second Internet Service Provider (ISP) and associated with a second Domain Name System (DNS) address space, wherein the first and the second ISPs are administratively distinct;

a transceiver that is configured to receive at least one of the information and the additional information over a network;

independently creating a combined autoconfiguration script based on current client proxy settings, without the current client proxy settings being provided to the VPN manager, wherein the combined autoconfiguration script comprises at least part of the information and at least part of the additional information;

receiving at least one network request that is associated with a network address;

configuring a client browser of the network device to perform autoconfiguration, including running the combined autoconfiguration script that determines which of the first and the second proxy servers to send the least one request that is associated with the network address to based on the association between the network address and one or more of the first ISP, the first DNS address space, the second ISP or the second DNS address space; and forwarding the at least one network request to the determined proxy server, wherein the combined autoconfiguration script is configured to split traffic between at least the first and the second proxy servers based on traffic destination by performing the determining step for each of the at least one network request.

17. A client device for managing proxy configurations, comprising:

a transceiver that is configured to send and receive signals over a network; and a computer processor that is configured to perform actions, the actions comprising:

requesting information that is associated with a first proxy server, wherein the first proxy server is associated with a virtual private network (VPN), a first internet service provider (ISP), and a first Domain Name System (DNS) address space associated with the first ISP, wherein the VPN is associated with a VPN manager;

receiving the information;

requesting additional information that is associated with a second proxy server, wherein the second proxy server is associated with a second ISP and a second DNS address space, wherein the first and the second ISPs are administratively distinct;

receiving the additional information;

independently creating a combined autoconfiguration script based on current client proxy settings, without the current client proxy settings being provided to a VPN manager, wherein the combined autoconfiguration script comprises at least part of the information and at least part of the additional information;

configuring a client browser of the client device to employ the combined autoconfiguration script in managing the proxy configurations;

receiving a network request that is associated with a network address;

running the combined autoconfiguration script that performs autoconfiguration, including determining which proxy server to send the network request to, based in part on the network address and the first DNS address space and the second DNS address space; and forwarding the network request to the determined proxy server, wherein determining which proxy server to send the request comprises:

determining whether the requested network address is included in a list of hostnames included in the first DNS address space;

when the network address is included in the list, selecting the first proxy server to manage the requested network address; and when the network address is not included in the list, selecting the second proxy server to manage the requested network address.

18. The client device of claim 17, wherein the information includes a URL of the first proxy server, and wherein the additional information includes a URL of the second proxy server.

19. The client device of claim 17, wherein the information includes a list of addresses that are associated with the first internet service provider, and wherein the additional information includes another list of addresses that are associated with the second ISP.

20. A system for managing proxy configurations, comprising:

a virtual private network manager that is configured to perform actions, the actions comprising:

providing access to a virtual private network; and providing information that is associated with a first proxy server, wherein the first proxy server is associated with the virtual private network, a first Internet Service Provider (ISP), and associated with a first Domain Name System (DNS) address space; and a client device including at least one computer processor that is configured to perform actions, the actions comprising:

configuring a browser for a default proxy configuration, wherein the default proxy configuration is associated with a second proxy server, and wherein the second proxy server is associated with another network, associated with a second ISP, and associated with a second DNS address space, wherein the first and the second ISPs are administratively distinct;

making a request to the virtual private network manager for access to the virtual private network;

making a request for the information;

receiving the information;

independently creating a combined autoconfiguration script based on current client proxy settings, without the current client proxy settings being provided to the VPN manager, wherein the combined autoconfiguration script comprises at least part of the information and at least part of the proxy configuration associated with the second proxy server;

configuring a client browser to employ the combined autoconfiguration script;

receiving a network request that is associated with a network address; and running the combined autoconfiguration script that performs autoconfiguration, including determining which proxy server to send the network request to based on one or more of the first ISP, first DNS address space, the second ISP, or the second DNS address space, wherein determining which proxy server to send the network request to includes determining whether the network address is included in a list of hostnames included in the first DNS address space;

when the network address is included in the list, selecting the first proxy server to manage the requested network address; and when the network address is not included in the list, selecting the second proxy server to manage the requested network address.

* * * * *